(12) United States Patent
Ovaere et al.

(10) Patent No.: US 10,730,160 B2
(45) Date of Patent: Aug. 4, 2020

(54) SLIPRING GRINDING METHOD

(71) Applicant: Mersen Benelux BV, Schiedam (NL)

(72) Inventors: Peter Jacques Ovaere, Wemmel (BE); Pieter-Jan Patrick Schepens, Aarschot (BE)

(73) Assignee: MERSEN BENELUX BV, Schiedam (NL)

( * ) Notice: Subject to any disclaimer, the term of this patent is extended or adjusted under 35 U.S.C. 154(b) by 141 days.

(21) Appl. No.: 15/561,947

(22) PCT Filed: Apr. 29, 2016

(86) PCT No.: PCT/EP2016/059638
§ 371 (c)(1),
(2) Date: Sep. 26, 2017

(87) PCT Pub. No.: WO2016/174218
PCT Pub. Date: Nov. 3, 2016

(65) Prior Publication Data
US 2018/0111245 A1 Apr. 26, 2018

(30) Foreign Application Priority Data
Apr. 30, 2015 (NL) ..................................... 2014740

(51) Int. Cl.
| | |
|---|---|
| *B24B 23/08* | (2006.01) |
| *B24B 5/36* | (2006.01) |
| *H01R 43/14* | (2006.01) |
| *H02K 13/00* | (2006.01) |
| *B23P 6/00* | (2006.01) |

(52) U.S. Cl.
CPC ................ *B24B 23/08* (2013.01); *B23P 6/00* (2013.01); *B24B 5/363* (2013.01); *H01R 43/14* (2013.01); *H02K 13/00* (2013.01); *H02K 13/003* (2013.01)

(58) Field of Classification Search
CPC ........... B24B 23/08; B24B 5/363; B24B 5/36; H02K 13/003; H01R 43/14
USPC ............................... 451/418, 5, 49, 163, 166
See application file for complete search history.

(56) References Cited

U.S. PATENT DOCUMENTS

| | | | |
|---|---|---|---|
| 1,935,805 A | 11/1933 | Luft | |
| 2,741,078 A | 4/1956 | Tenney | |
| 2,784,537 A * | 3/1957 | Schinske | ................. B24B 55/06 |
| | | | 451/418 |
| 2014/0009142 A1 * | 1/2014 | Cauwenberghs | ...... H01R 39/58 |
| | | | 324/207.11 |

* cited by examiner

*Primary Examiner* — Robert A Rose
(74) *Attorney, Agent, or Firm* — James S. Kreddie; Bozicevic, Field & Francis LLP

(57) ABSTRACT

This invention relates to methods and materials for slip ring grinding of a generator rotor, without the need of dismounting the slip ring from the rotor of the generator, and allowing the grinding process to be performed whilst the generator is on full-load operation. As such the methods and materials of the present invention differs from current solution. Whilst allowing on-line grinding of the slip ring, the current solutions require low-speed rotations and accordingly operational shutdown of the generator. Allowing on-load grinding, the present invention greatly shortens the downtime of the generator and to perform maintenance on the slip ring beyond the provided standard maintenance schedule.

10 Claims, 6 Drawing Sheets

SLIPRING GRINDING METHOD

CROSS-REFERENCE TO RELATED APPLICATIONS

This application is a § 371 national phase of International Application No. PCT/EP2016/059638, filed on Apr. 29, 2016, which claims the benefit of Netherlands Application No. 2014740, filed on Apr. 30, 2015, which applications are incorporated by reference herein.

FIELD OF THE INVENTION

This invention relates to methods and materials for slipring grinding of a generator rotor, without the need of dismounting the slipring from the rotor of the generator, and allowing the grinding process to be performed whilst the generator is on full-load operation. As such the methods and materials of the present invention differs from current solution. Whilst allowing on-line grinding of the slipring, the current solutions require low-speed rotations and accordingly operational shutdown of the generator. Allowing on-load grinding, the present invention greatly shortens the downtime of the generator and to perform maintenance on the slipring beyond the provided standard maintenance schedule.

BACKGROUND TO THE INVENTION

Each deformation of a collector or slipring of rotating electrical machines will lead to problems during operation. These problems manifest themselves in various ways such as brush sparking, high brush wear, noise, damage of brush tops, damage of springs of brush holders and the like. If the slipring is out of round or has any disturbances on the surfaces, the electrical contact between brush and ring is compromised, not only causing the aforementioned problems, but equally causing spark erosion. Because of this erosion the surface of the ring will be attacked even more, causing heavier sparking.

All of the foregoing problems are more pronounced with sliprings and carbon brushes on turbo-alternators. Such turbo-alternators are turbine driven synchronous alternators that are used for power generation in either industry or by power companies, and run at constant speeds of 3000 or 3600 rpm, depending on the required frequency of the alternator output. At 3000 or 3600 rpm the surface speed of the slipring is quiet high with values exceeding 250 km/h or 80 m/sec are not exceptional. The better (the more contact points between the slipring and the brush) the contact between the slipring and the brush, the better the high operational currents is carried from the slipring surface through the carbon brushes, lengthening the brush life.

Regular maintenance of the commutator or slipring is accordingly required. To address surface erosion of the slipring the present invention provides an on-load machining grinding tool.

SUMMARY OF THE INVENTION

The present invention can be summarized based on the following embodiments.

In a first aspect the present invention is directed to a method of on-load grinding of slip rings and/or collectors of electrical machines, said method comprising replacing on-load a carbon brush holder, with a slip ring grinding machining tool (1) characterized in that said slip ring grinding machining tool is compatible with the slip ring brush holder assembly and comprises a grinding stone holder (2) wherein said grinding stone holder is capable of being displaced in two directions in the same plane whilst mounted in the slip ring brush holder assembly. In the foregoing method the grinding stone holder is displaced transversely with a pendulum movement.

It is accordingly an object of the present invention to provide a method of on-load grinding machining of slip rings and/or collectors of electrical machines, said method including the step of replacing on-load a carbon brush holder, with a slip ring grinding machining tool compatible with the slip ring brush holder assembly, said slip ring grinding machining tool comprising a grinding stone holder wherein said grinding stone holder is capable of being displaced in two directions in the same plane whilst mounted in the slip ring brush holder assembly, and characterized in that the grinding stone holder is operated to combine a slow longitudinal movement of a grinding stone with a fast transversal pendulum movement of said grinding stone.

In particular the grinding stone holder is displaced transversely with a pendulum movement of a least 10 oscillations per second.

In one embodiment of the method according to the invention, the grinding stone holder is displaced longitudinally with velocity of up to 10 μm; in particular up to 50 μm per second. In particular the grinding stone holder is displaced longitudinally with a stepwise (slow) longitudinal movement. More in particular with steps starting at 10 μm. Even more in particular with steps that can vary in size and be anything selected from about 10 μm, 15 μm, 17 μm, 20 μm, 25 μm, 30 μm, 33 μm, 35 μm, 40 μm, 43 μm, 45 μm, 50 μm, 55 μm, 60 μm, 70 μm, 80 μm, 90 μm, 100 μm and more.

In one embodiment of the method according to the invention the grinding holder further comprises an actuator (5) to control the displacement of the grinding stone holder. In particular a first actuator (6) to control the transversal displacement of the grinding stone holder and a second actuator (7) to control the longitudinal displacement of the grinding stone holder. The method according to the invention wherein the displacement of the grinding holder can be performed manually or automatically.

The method according to the invention further comprising the step of measuring the ring concentricity. In a particular embodiment further using said measurement to control the displacement of the grinding stone holder.

In a second aspect the present invention is directed to a slip ring grinding machining tool (1) comprising a grinding stone holder (2) and a connector piece (3), wherein said grinding stone holder is capable of being displaced in at least one direction and wherein the connector piece is compatible with a slip ring brush holder assembly. In one embodiment the grinding stone holder is capable of being displaced in two directions in the same plane.

The slip ring grinding machining tool accordingly comprises displacement means (4) for the displacement of the grinding stone holder. It further comprises an actuator (5) to control the displacement means. In one embodiment it comprises a first actuator (6) to control the displacement in a first direction and a second actuator (7) to control the displacement in a second direction. In a preferred embodiment the displacement means consist of an x-y table (4), and a first actuator is present to control the displacement of the x-y table in the x-direction and a second actuator is present to control the displacement of the x-y table in the y-direction. Within the method of the present invention the first direction is the transversal movement of the grinding stone holder and the second direction is the longitudinal displacement of the grinding stone holder. In one embodiment the connector piece (3) comprises an electrically isolated controller (8).

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

Figure 1:
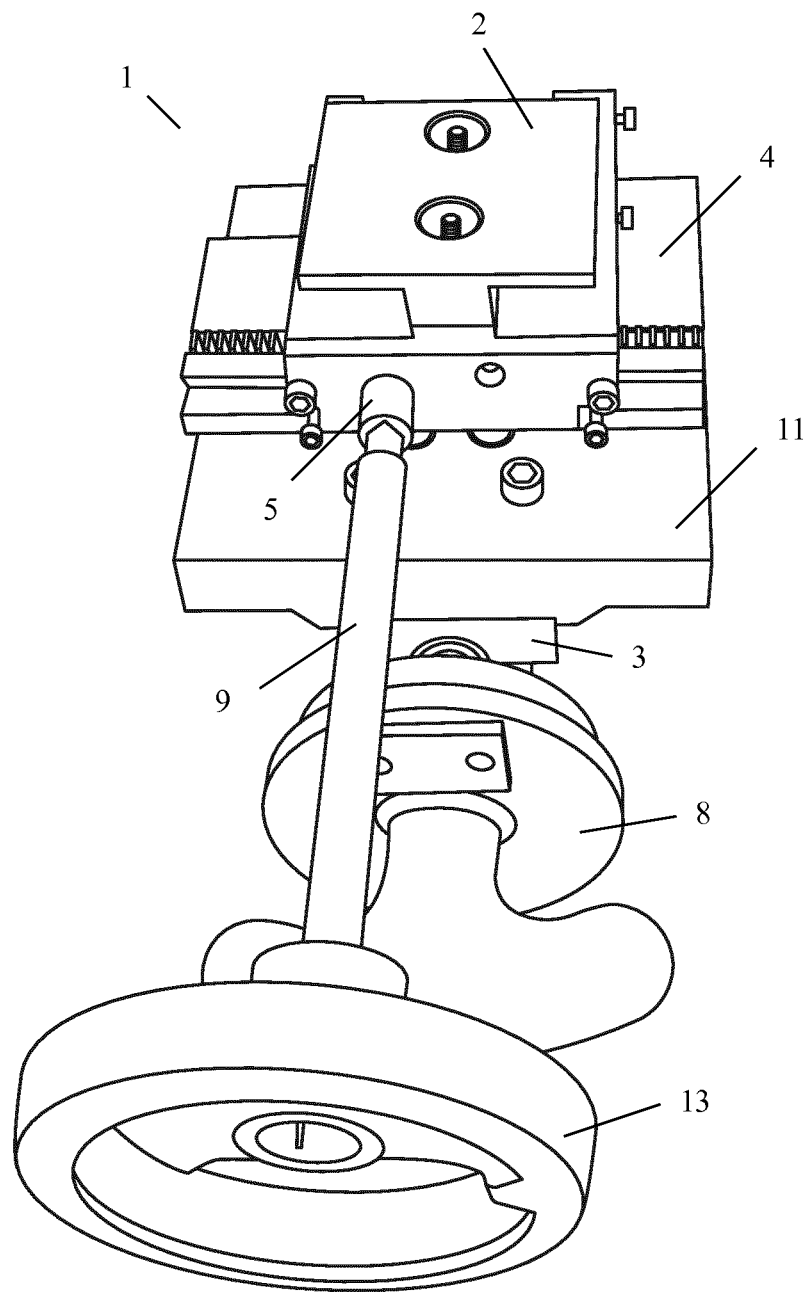
FIG. 1: Perspective top view of a slip ring grinding machining tool (1) according to the invention, showing the controller (8) at the connector piece (3), compatible with and allowing the tool to be mounted in the carbon brush holder. It further shows the grinding stone holder (2) on an x-y table (4) with a first (6) and second actuator (7) at the same face (side) of the x-y table. In the present embodiment the actuator is manually controlled using the removable rotating tool (screwdriver) (9)
Figure 2:
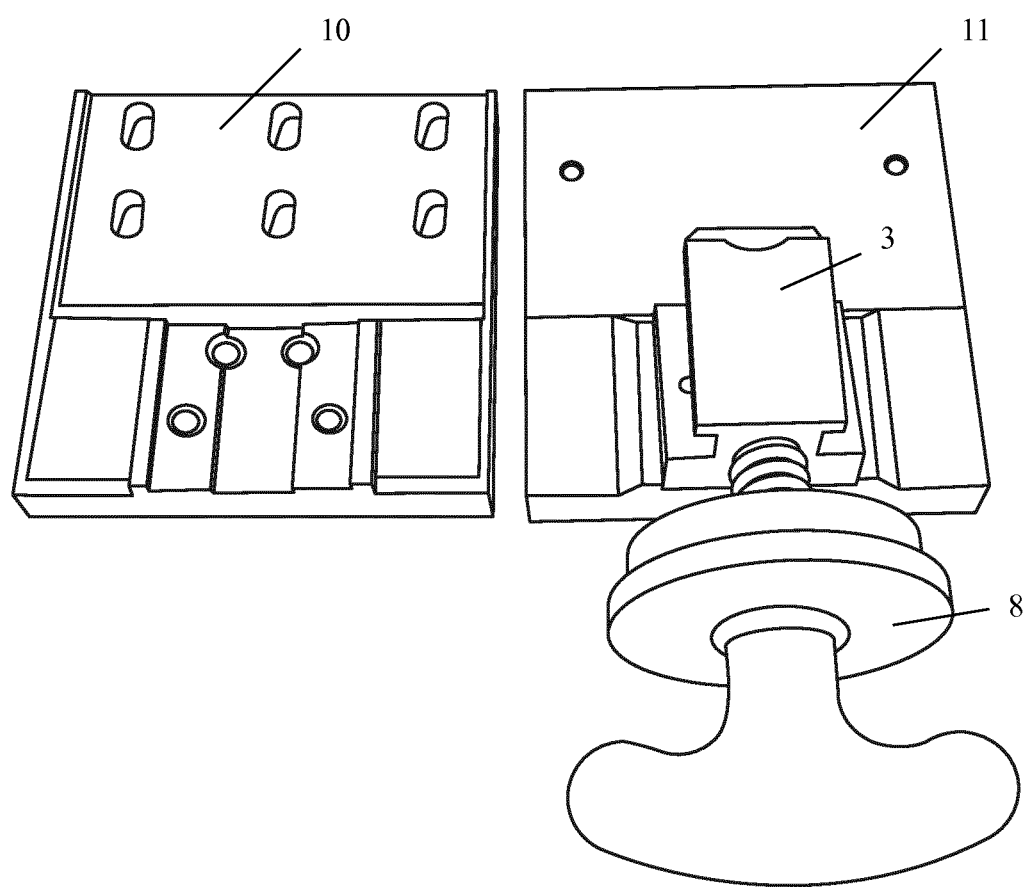
FIG. 2: Perspective bottom view of a base of the slip ring grinding machining tool according to the invention. On the left the base plate of a carbon brush holder (10). On the right a base plate of the tool (11) according to the invention, showing the uniformity in size with the connector piece (3) and a twist lock controller (8) originally found at the base of the carbon brush holder, mounted on the base plate (11) of the slip ring grinding machining tool.
Figure 3:
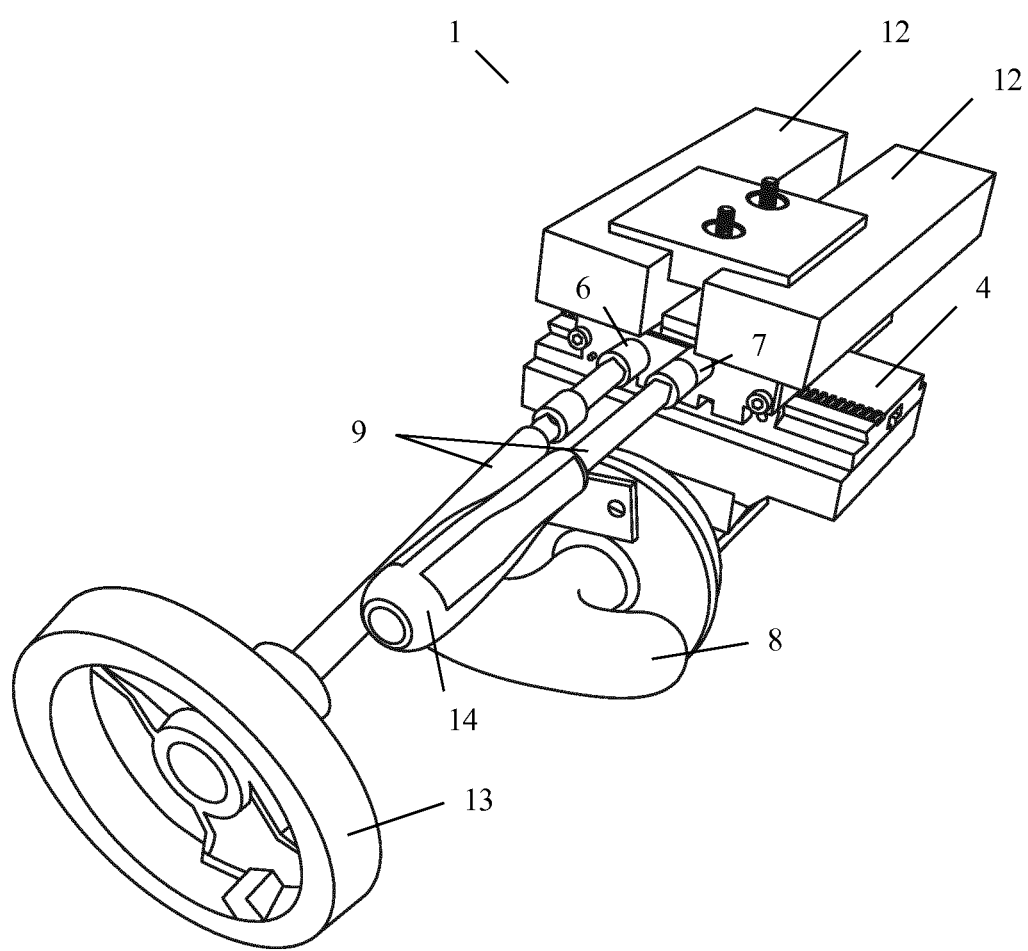
FIG. 3: Perspective front side view of a slip ring grinding machining tool (1) according to the invention, showing the controller (8) at the connector piece (3), now comprising grinding stone (12) fixed on the x-y table (4) with the grinding stone holder (2). Again the actuators (6,7) of the x-y table are controlled manually with removable rotating tools (9). As shown, one of the rotating tools has a turning wheel (13) where the other has a handle (14) as typically seen on a screwdriver. In the methods of the invention, the machining follows from the combination of a stepwise (slow) longitudinal movement of the grinding stone with a fast transversal pendulum movement. Such fast transversal pendulum movement is easier to be carried out manually by means of a turning wheel. Thus in a particular embodiment, one of the rotating tools to control the actuators of the x-y table comprises a turning wheel. Consequently, in the embodiment shown, the left and first actuator (6) controls the transversal (x) direction of the x-y table and the right and second actuator (7) controls the longitudinal (y) direction of the x-y table.

In a first aspect the present invention provides a method of on-load grinding of slip rings and/or collectors of electrical machines, said method including the step of replacing on-load a carbon brush holder, with a slip ring grinding machining tool characterized in that said slip ring grinding machining tool is compatible with the slip ring brush holder assembly and comprises a grinding stone holder wherein said grinding stone holder is capable of being displaced in at least one direction whilst mounted in the slip ring brush holder assembly.

The invention is based on the finding that it is indeed possible to machine grind a slip ring and/or collector of electrical machines when the electrical motor is in full operational mode. Different from the on-load polishing solutions wherein on of more of the carbon brushes comprises a grinding stone, the grinding machining tool of the present invention allows actual and controlled displacement of the position of the grinding stone with respect to the slip-ring and/or collector whilst the electrical motor is in full operational mode. In the on-load polishing solutions a grinding stone is simply inserted into the carbon-brush. Present in the carbon-brush holder, the thus modified brush will be kept against the slip-ring and/or collector under spring action of the brush holder. As such the modified brush will slavishly follow the surface of the slip-ring and/or collector, but there is no possibility to adjust and control the displacement of the grinding stone with respect to the slip-ring and/or collector.

Positioning the machining tool of the present invention just in front of the surface of the slip-ring and/or collector and subsequently slowly advancing the stone towards the surface, dependent on the deformations of the slip-ring and/or collector, at a first longitudinal position of the stone the slip-ring and/or collector will start occasionally toughing the grinding stone. The stone is kept in said first position, and under its working the touching deformations will be adjusted (flattened out). Only subsequently, the stone is further advanced to repeat the foregoing grinding procedure at a new longitudinal position. The stepwise advancing of the grinding stone is repeated till a uniform touch of the stone with the slip-ring and/or collector is being achieved.

It has been observed that best results are achieved when the grinding stone is also displaced sideways at each of the longitudinal positions. Hence, the method of the present invention is characterized in that the grinding stone holder is capable of being displaced in two directions in the same plane, whilst mounted in the slip ring brush holder assembly. Such transversal movement of the grinding stone at each of the longitudinal positions reduces the wear of the grinding stone and enhances the grinding action of the stone. In addition, the transversal movement of the stone together with the stepwise advancing of the stone results in cross-hatching of the surface. Such cross-hatched surface is beneficial to the formation of the cupper oxide-carbon film at the surface of the slip-ring and/or collector. As is known to the skilled artisan, a uniform cupper oxide-carbon film is necessary for optimum brush slip ring working.

In the grinding process, the transversal movement of the grinding stone is preferably a pendulum movement. Compared to the longitudinal displacement the transversal pendulum movement is much faster. Such fast transversal displacement is a requisite given the on-load operation of the slip ring grinding machining tool. As already mentioned herein before, at rotation speeds of 3000 or 3600 rpm the surface speed of the slipring of turbo generators is high with values exceeding 250 km/h or 80 m/sec. Cross-hatching is accordingly dependent on the transversal traveling distance of the grinding stone relative to the rotation speed of the ring. A fast transversal pendulum movement is thus required; in particular a pendulum movement of at least 10 oscillations per second. Sling movements of up to 40; in particular of up to 100 oscillations per second are not to be excluded, the higher the frequency, the better the cross-lining of the grooves. As evident from the foregoing description, the overall longitudinal movement of the grinding stone is slow. Typically the forward movement is a stepwise movement with steps starting a 10 μm. Evidently, it is no requisite for the longitudinal displacement to be a standardized displacement. The steps can vary in size and be anything selected from about 10 μm, 15 μm, 17 μm, 20 μm, 25 μm, 30 μm, 33 rpm, 35 rpm, 40 μm, 43 rpm, 45 rpm, 50 μm, 55 μm, 60 μm, 70 μm, 80 μm, 90 μm, 100 μm and more. Expressed differently, the longitudinal movement of the grinding stone is at a velocity of up to about 10 μm per second; up to about 50 μm per second; up to about 100 μm per second; up to about 500 μm per second; or even up to about 1 mm per second.

Combination of the stepwise (slow) longitudinal movement of the grinding stone with a fast transversal pendulum movement results in an unprecedented on load machining of the slip-ring and/or collector. Using the protocol of the present invention the dynamic circulation of carbon brushes on the surface slip ring and/or collector can be optimized, surface deformations can be reduced to values of 50 μm or less preventing undesired contact loss of the brushes with the surface. When automated, surface deformations of less than 10 μm can be achieved. Such low values will significantly enhance the lifetime of the carbon brushes as they'll no longer experience vibrations and allow the formation of a uniform cupper oxide-carbon film. Thus in a further aspect, the present invention is further characterized in that the displacement of the grinding stone holder can be performed manually or automatically. Per reference to the exemplary data, it has been surprisingly found that the on-load grinding method of the present invention has an almost instant effect on the brush movements. Surface deformations and/or out-of-roundness of the slip-ring and/or collector causes the carbon brushes to jump over the surface, with contact loss. These brush movements result in brush sparking, high brush wear, noise, damage of brush tops, damage of springs of brush holders, spark erosion and the like, further enhancing the operational wear and requiring frequent maintenance. Using the combination of a slow longitudinal movement with a fast transversal pendulum movement, the amplitude of the brush movement typically starting at more than 1000 μm is already halved after only 10 seconds of machining. After 4 hours of machining the amplitude is reduced to values as low as about 30 μm, without contact loss and further reductions to values of about 10 μm can even be achieved. Due to the cross-hatching occurring in the on-load grinding method of the instant application the stand time (operational time between maintenance) is 10 times longer compared to the traditional low-speed off-line radial grinding processes.

In a particular embodiment of the present invention the displacement of the grinding stone in two directions in the same plane is realized by mounting the grinding stone and its eventual holder on an x-y table. Such x-y table will typically comprise actuators to control the displacement of the table. In principle any configuration on the presence of the actuators is useful in the context of the invention. In one embodiment the actuators are present on the same (side) face of the machining tool. For example, in case the grinding stone and its eventual holder is mounted on an x-y table, in one embodiment the means to control the displacement of the x-y table (the actuators) are present on the same face. Taking into consideration the accessibility to the user, in one embodiment the actuators are present in the same face wherein said face is accessible to the operator. In a particular embodiment said face is opposite to and distal from the slip ring and/or collector, i.e. opposite to the side of the machining tool facing the slip ring and/or collector. Thus in a further embodiment the machining tool comprises an x-y table whereupon the grinding stone and its eventual holder are mounted. In one embodiment the machining tool comprising an x-y table is further characterized in that the actuators are present on the same (side) face of the x-y table; in particular at a face accessible to the operator; more in particular at a face distal from the slip ring and/or collector.

When describing the protocol according to the invention, the endpoint for the stepwise (slow) longitudinal movement of the grinding stone is said to be based on a uniform touch of the stone with the slip-ring and/or collector. As such no actual measurement of the slip-ring concentricity is required during the machining protocol. In principle it makes the process universally applicable without the need of specialized equipment like high-speed cameras to measure the slip ring concentricity. Notwithstanding, in a further embodiment, the method according to the present invention may include a step of measuring the ring concentricity. In principle any means to measure the on load (high velocity) ring concentricity can be used, such as for example high-speed cameras or the like. In a particular embodiment the means to measure the on load slip ring concentricity consists of a brush holder assembly as described in US patent publication U.S. 2014/0009142, and comprising a positioning sensor that allows a continuously high speed and high resolution monitoring of the position of the brushes and accordingly of the slip ring concentricity. Where in first instance the monitoring of the slip ring concentricity can simply be used to determine the end-point of the machining method, but in a further embodiment the measurement can be used to control the machining process, and then in particular the stepwise longitudinal displacement of the slip ring grinding machining tool. Based on the measurement of the slip ring concentricity, the method may propose one or more of the following parameters to the operator of the slip ring grinding machining tool of the present invention;

the depth of the longitudinal displacement steps;
the timing for the transversal pendulum movement;
the frequency of the transversal pendulum movement;
the longitudinal (forward) traveling speed;
when to advance the grinding stone;

when to stop the grinding machining method.

In a further embodiment, and in particular in said instance wherein the displacement of the grinding stone has been automated, the measurement of the slip ring concentricity can be used to control said displacement. In said embodiment a fully automated protocol will be realized. Thus in a further aspect the present invention provides a method of on-load machining of slip rings and/or collectors of electrical machines, said method comprising;

the stepwise (slow) longitudinal movement of a grinding stone with a fast transversal pendulum movement of the grinding stone;

continuously measuring the slip ring concentricity; and using said continuous measurement of the slip ring concentricity to control at least the longitudinal movement of a grinding stone; in particular to control both the longitudinal and the transversal pendulum movement of the grinding stone.

In said method the transversal pendulum movement is in particular a pendulum movement of at least 10 oscillations per second. Oscillations of up to 100 oscillations per second are not to be excluded. In said method the longitudinal forward movement is a stepwise movement with steps starting a 10 µm. Evidently, it is no requisite for the longitudinal displacement to be a standardized displacement. The steps can vary in size and be anything selected from about 10 µm, 15 µm, 17 µm, 20 µm, 25 µm, 30 µm, 33 µm, 35 µm, 40 µm, 43 µm, 45 µm, 50 µm, 55 µm, 60 µm, 70 µm, 80 µm, 90 µm, 100 µm and more. Expressed differently, the longitudinal movement of the grinding stone is at a velocity of up to about 10 µm per second; up to about 50 µm per second; up to about 100 µm per second; up to about 500 µm per second; or even up to about 1 mm per second.

In a particular embodiment, the measurement of the slip ring concentricity is performed using a brush holder assembly comprising a positioning sensor that allows a continuously high speed and high resolution monitoring of the position of the brushes.

In a further aspect the present invention provides a slip ring grinding machining tool for use in the methods as described herein. Given the requisite to control the position of the grinding stone with respect to the slip ring surface and the requirement to perform the machining whilst the electrical motor is in full operational mode, the slip ring grinding machining tool of the present invention is characterized in that it is compatible with the slip ring brush holder assembly to allow on-load placement and in that it comprises a grinding stone holder capable of being displaced in at least one direction whilst mounted in the slip ring brush holder assembly. In particular embodiment of the slip ring grinding machining tool, it comprises an x-y table. In such embodiment the grinding stone is mounted on the x-y table, i.e. the grinding stone holder is mounted on the x-y table. In a particular embodiment the slip ring grinding machining tool comprises an actuator to control the displacement of the grinding stone (grinding stone holder). In a preferred embodiment the slip ring grinding machining tool comprises a first actuator to control the longitudinal movement of the grinding stone (grinding stone holder), and a second actuator to control the transversal movement of the grinding stone (grinding stone holder). In one embodiment said first and second actuator are present at the same face (side) of the slip ring grinding machining tool; more in particular at a face (side) opposite to and distal from side of the slip ring grinding machining tool facing the slip ring and/or collector.

To allow an isolated and on-load placement of the slip ring grinding machining tool in the slip ring brush holder assembly, the former comprises a connector piece compatible with the slip ring brush holder assembly. The connector piece may for example consist of the connector piece found on the slip ring brush holder. Such connector pieces typically comprise controls (such as for example a twist closure) to allow on-load replacement of the slip ring brush holder. To assure electrical isolation under high operation voltage these controls are typically prepared of electrical insulation material such as Bakelite.

Figure 4:
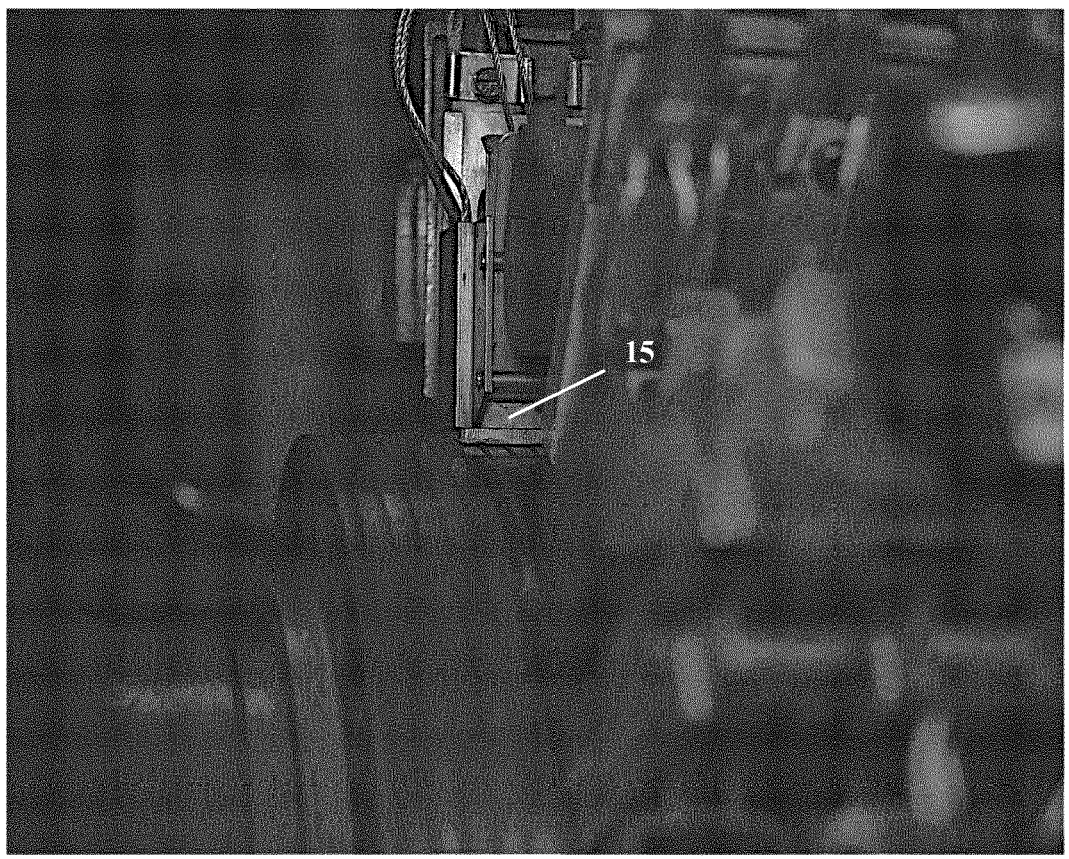
FIG. 4: Picture taken from the high-speed camera focused on a mark (15) at the carbon brush of a turbo alternator at full production (3000 rpm).
Figure 5:
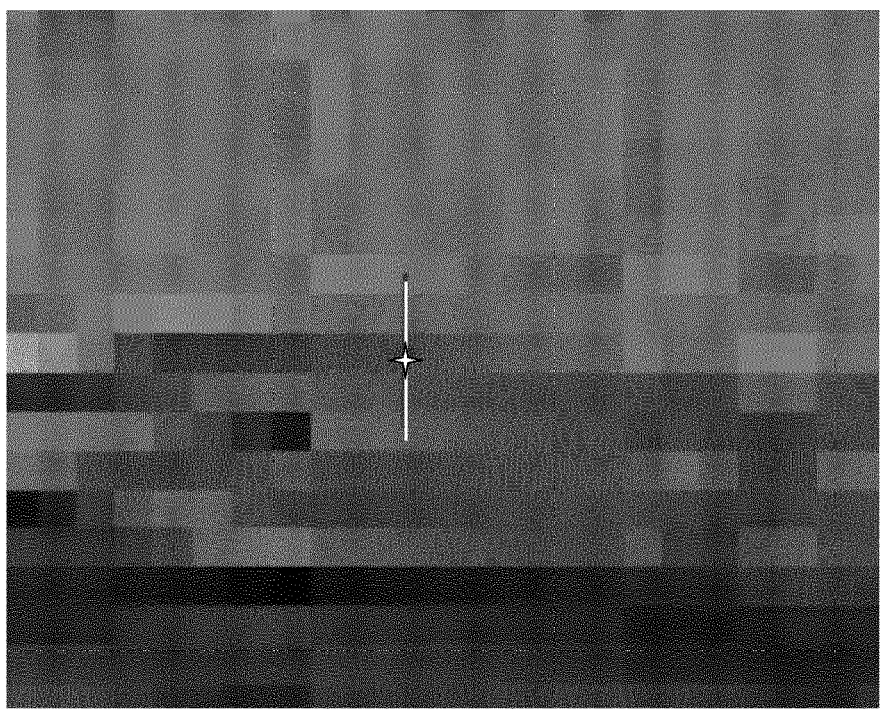
FIG. 5: Image diagram of the images taken from the high-speed camera, showing in white the pixel trace of the marker position (star), thus corresponding with the pixel displacement of the carbon brush.

The invention will now be illustrated by the results of the method according to the invention when performed on a turbo alternator at full production (3000 rpm). To measure the grinding process, a high-speed camera was focused on a marker on the carbon brush (FIG. 4). Based on the resolution of the camera, pixel displacement of the marker in the image diagram (FIG. 5) is converted into the actual displacement of the brush mark over time. At the start of the experiment the grinding stone was advanced till it touched the first unevenness at the surface of the collector and slowly advanced at about 10 µm per second. During the grinding the stone was displaced transversally with a pendulum movement of about 10 oscillations per second.

Figure 6:
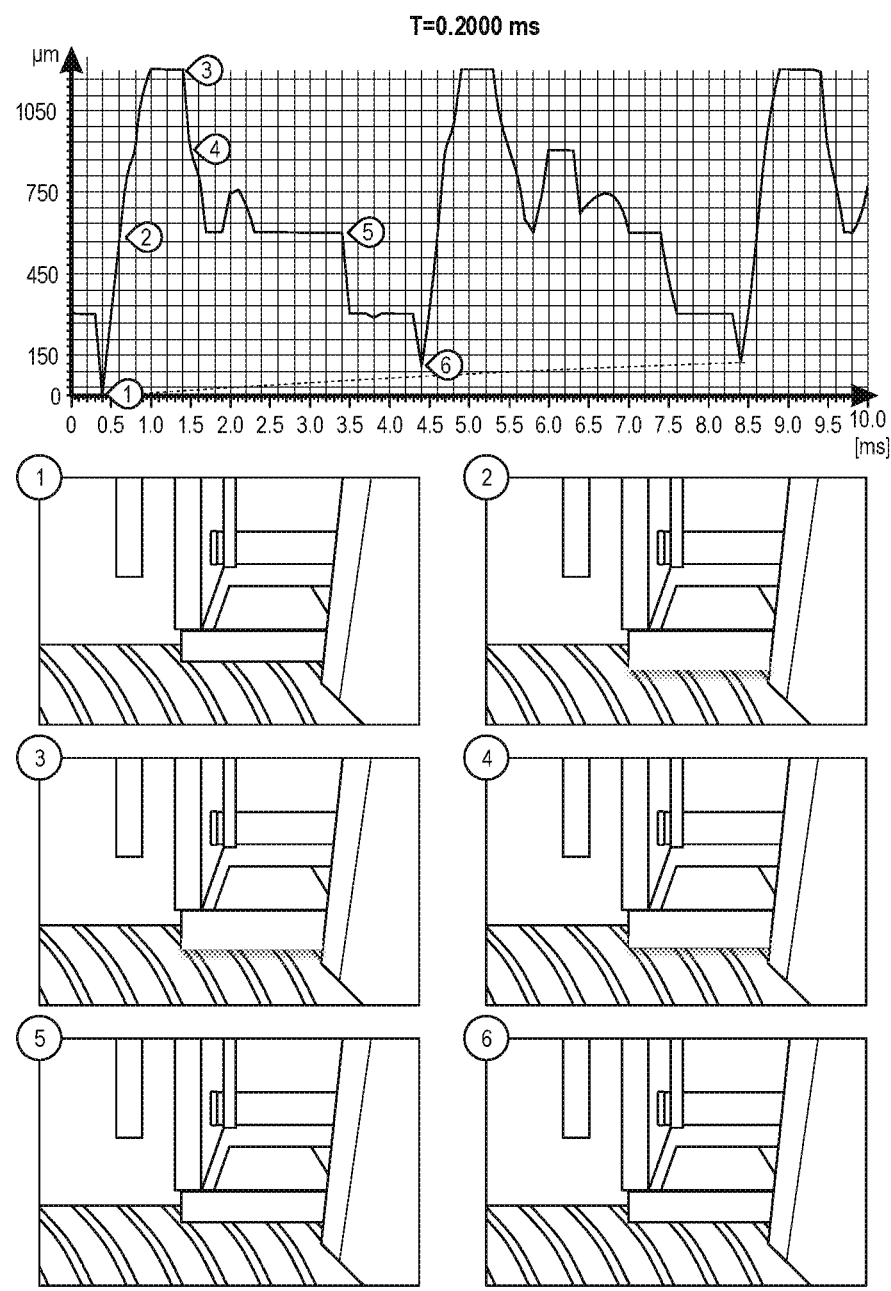
FIG. 6: Shows brush movements (μm) over time (ms) at the start of the grinding process in the diagram at the top of the page. At the numbered positions pictures are reproduced from the high-speed camera. In pictures 2, 3 and 4 it can be seen how the carbon brush loses contact with the surface of the collector. Notable in the diagram is the difference in depth between the lowest position at the start (picture 1) of the grinding process and at the start of the second cycle (picture 6) at about 4.5 ms. Thus showing an immediate effect of the grinding process, being the combination of a slow longitudinal movement with a fast transversal pendulum movement, on the unevenness of the collector.
Figure 7:
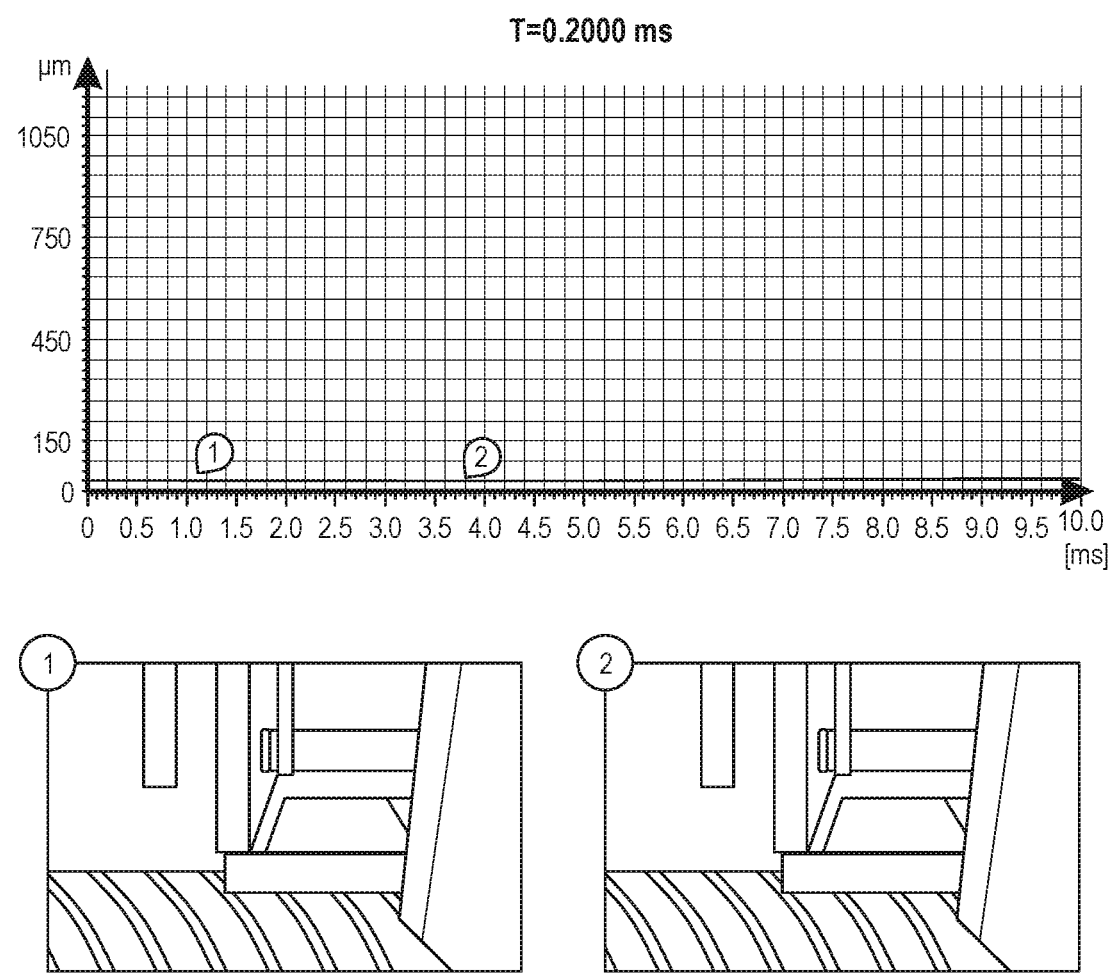
FIG. 7: Shows brush movements (μm) over time (ms) after 4 hours of grinding in the diagram at the top of the page. At the numbered positions pictures are reproduced from the high-speed camera. After 4 hours, and compared to the brush movements at the start, the displacements are reduced to a flat line.

In FIG. 6 the brush movements are shown at the start of the grinding process, i.e. the first 10 milliseconds. At the start, brush movements are within a range of up to 1400 µm. In the series of numbered pictures, it is notable how the brush loses contact with the collector. Remarkably however is the immediate effect noticeable from the grinding protocol used. Looking at the repetitive pattern, the immediate upward shift of the lowest starting point (connected by the black line) is already visible in this short time trace and an indication of a direct effect of the grinding process on the imperfections at the surface of the collector. The final trace after 4 hours of grinding is shown in FIG. 7. A flat line is achieved and measuring the actual displacement of the brush mark over time, displacements are reduced to maximal displacements of about 30 µm, or about 50 times less when compared to the start of the experiment. As evident from the pictures, the brush is always in contact with the surface of the slip ring.

The foregoing description of the invention has a number of particular features which should preferably be employed in combination although each is useful separately without departure from the scope of the invention. It will be understood that the invention may be embodied otherwise than as herein specifically illustrated or described, and that certain changes in the form and arrangement of parts and the specific manner of practicing the invention may be made within the underlying idea or principles of the invention and are within the scope of the appended claims.

The invention claimed is:

1. A method of on-load grinding machining of slip rings or collectors of electrical machines, said method including the step of replacing on-load a carbon brush holder, with a slip ring grinding machining tool compatible with a slip ring brush holder assembly, said slip ring grinding machining tool comprising a connector piece (3) with an electrically isolated controller (8), and a grinding stone holder wherein said grinding stone holder is capable of being displaced in two directions in the same plane whilst mounted in the slip ring brush holder assembly, and characterized in that the grinding stone holder is operated to combine a slow stepwise longitudinal movement of a grinding stone with a velocity of up to 10 µm per second with a fast transversal pendulum movement of at least 10 oscillations per second of said grinding stone.

2. The method according to claim 1, wherein the grinding stone holder further comprises an actuator to control the displacement of the grinding stone holder.

3. The method according to claim 1, wherein the displacement of the grinding stone holder can be performed manually or automatically.

4. The method according to claim 1, wherein the grinding stone holder is mounted on an x-y table.

5. The method according to claim 4, wherein the x-y table is characterized in that the means to control the displacement of the x-y table are present on the same face.

6. The method according to claim 5, wherein said face is accessible to the operator.

7. The method according to claim 1, further comprising the step of measuring the ring concentricity.

8. The method according to claim 7, wherein the ring concentricity is determined using high-speed cameras.

9. The method according to claim 7, wherein the measurement of the ring concentricity is used to control the displacement of the x-y table.

10. The method according to claim 5, wherein said face is accessible distal from the slip ring or collector.

\* \* \* \* \*